(12) United States Patent
Preus (10) Patent No.: US 8,573,937 B2
(45) Date of Patent: Nov. 5, 2013

(54) SYSTEM FOR PROVIDING DYNAMIC PITCH CONTROL IN A WIND TURBINE

(75) Inventor: Robert W. Preus, Newberg, OR (US)

(73) Assignee: Xzeres Corp., Wilsonville, OR (US)

( * ) Notice: Subject to any disclaimer, the term of this patent is extended or adjusted under 35 U.S.C. 154(b) by 916 days.

(21) Appl. No.: 12/623,129

(22) Filed: Nov. 20, 2009

(65) Prior Publication Data
US 2010/0129215 A1 May 27, 2010

Related U.S. Application Data (60) Provisional application No. 61/117,059, filed on Nov. 21, 2008, provisional application No. 61/117,061, filed on Nov. 21, 2008.

(51) Int. Cl.
*F01D 7/02* (2006.01)
*F03D 7/04* (2006.01)

(52) U.S. Cl.
USPC .............................................. 416/51; 416/140

(58) Field of Classification Search
USPC ........... 416/41, 44, 46, 51, 52, 140, 141, 159, 416/164
See application file for complete search history.

(56) References Cited

U.S. PATENT DOCUMENTS

| | | | | |
|---|---|---|---|---|
| 1,482,690 A | * | 2/1924 | Lanzius | 416/51 |
| 2,086,686 A | * | 7/1937 | Weible | 416/51 |
| 2,383,002 A | * | 8/1945 | Mader | 416/52 |
| 2,533,321 A | * | 12/1950 | King | 416/40 |
| 3,976,397 A | | 8/1976 | Hunt | |
| 4,047,832 A | | 9/1977 | Sforza | |
| 4,050,246 A | | 9/1977 | Bourquardez | |
| 4,084,921 A | * | 4/1978 | Norz | 416/17 |
| 4,109,885 A | | 8/1978 | Pender | |
| 4,111,594 A | | 9/1978 | Sforza | |
| 4,257,736 A | * | 3/1981 | Jacobs | 416/51 |
| 4,355,955 A | | 10/1982 | Kisovec | |
| 4,435,646 A | | 3/1984 | Coleman et al. | |

(Continued)

FOREIGN PATENT DOCUMENTS

| | | |
|---|---|---|
| JP | 59134385 | 8/1984 |
| JP | 04194368 | 7/1992 |

(Continued)

OTHER PUBLICATIONS

International Search Report re: Application No. PCT/US2009/065396 dated Sep. 7, 2010, 12 pages.

*Primary Examiner* — Nathaniel Wiehe
*Assistant Examiner* — Ryan Ellis
(74) *Attorney, Agent, or Firm* — Fliesler Meyer LLP (57) ABSTRACT

A system for providing dynamic pitch control in a wind turbine. In accordance with an embodiment, the dynamic pitch control uses a starting spring to pitch the blades of the wind turbine into a starting position that is suited for very low wind speeds. The pitch control then automatically pitches the blades into a run position as the rotation speed increases, using a combination of a rotational mass and a restraining spring. This allows the turbine to be started, and to generate power, at a much lower starting wind speed yet still operate at optimal speeds in its typical running range. In accordance with an embodiment, as the wind speed further increases beyond an overspeed limit, the rotational mass overcomes its restraining spring, and automatically pitches the blades back toward and beyond their start position, reducing the likelihood of damage to the turbine caused by high rotation speeds.

6 Claims, 5 Drawing Sheets

(56) References Cited

U.S. PATENT DOCUMENTS

| | | |
|---|---|---|
| 4,474,531 A | 10/1984 | Weiss |
| 4,478,379 A | 10/1984 | Kerr |
| 4,495,423 A | 1/1985 | Rogers |
| 4,582,013 A | 4/1986 | Holland, Jr. |
| 4,601,444 A | 7/1986 | Lindenbaum |
| 4,695,012 A | 9/1987 | Lindenbaum |
| 4,703,189 A | 10/1987 | DiValentin et al. |
| 4,792,281 A | 12/1988 | Coleman |
| 4,795,113 A | 1/1989 | Minovitch |
| 4,807,129 A | 2/1989 | Perks |
| 4,947,334 A | 8/1990 | Massey et al. |
| 4,952,120 A | 8/1990 | Aubry et al. |
| 4,958,289 A | 9/1990 | Sum et al. |
| 4,967,550 A | 11/1990 | Acton et al. |
| 4,993,348 A | 2/1991 | Wald |
| 5,005,353 A | 4/1991 | Acton et al. |
| 5,011,373 A | 4/1991 | Aubry et al. |
| 5,064,143 A | 11/1991 | Bucher |
| 5,082,421 A | 1/1992 | Acton et al. |
| 5,083,039 A | 1/1992 | Richardson et al. |
| 5,086,993 A | 2/1992 | Wainfan |
| 5,140,170 A | 8/1992 | Henderson |
| 5,141,391 A | 8/1992 | Acton et al. |
| 5,224,665 A | 7/1993 | Goldsberry et al. |
| 5,225,712 A | 7/1993 | Erdman |
| 5,237,618 A | 8/1993 | Bethel |
| 5,474,425 A | 12/1995 | Lawler |
| 5,529,263 A | 6/1996 | Rudolph |
| 5,570,859 A | 11/1996 | Quandt |
| 5,709,419 A | 1/1998 | Roskey |
| 5,779,169 A | 7/1998 | Sloan |
| 5,798,631 A | 8/1998 | Spee et al. |
| 5,823,468 A | 10/1998 | Bothe |
| 5,915,649 A | 6/1999 | Head |
| 5,973,440 A | 10/1999 | Nitzsche et al. |
| 5,975,464 A | 11/1999 | Rutan |
| RE36,487 E | 1/2000 | Wainfan |
| 6,072,303 A | 6/2000 | Nickoladze et al. |
| 6,119,979 A | 9/2000 | Lee et al. |
| 6,129,306 A | 10/2000 | Pham |
| 6,137,187 A | 10/2000 | Mikhail et al. |
| 6,231,004 B1 | 5/2001 | Peebles |
| 6,239,506 B1 | 5/2001 | Roskey |
| 6,320,272 B1 | 11/2001 | Lading et al. |
| 6,322,324 B1 | 11/2001 | Kennedy et al. |
| 6,365,039 B1 | 4/2002 | Henkin et al. |
| 6,387,250 B1 | 5/2002 | Henkin et al. |
| 6,390,412 B1 | 5/2002 | Stevens |
| 6,420,795 B1 | 7/2002 | Mikhail et al. |
| 6,425,552 B1 | 7/2002 | Lee et al. |
| 6,453,669 B2 | 9/2002 | Kennedy et al. |
| 6,464,459 B2 | 10/2002 | Illingworth |
| 6,493,689 B2 | 12/2002 | Kotoulas et al. |
| 6,575,406 B2 | 6/2003 | Nelson |
| 6,581,537 B2 | 6/2003 | McBride et al. |
| 6,600,240 B2 | 7/2003 | Mikhail et al. |
| 6,607,161 B1 | 8/2003 | Krysinski et al. |
| 6,609,889 B1 | 8/2003 | Vilsboll |
| 6,612,522 B1 | 9/2003 | Aldrin et al. |
| 6,616,094 B2 | 9/2003 | Illingworth |
| 6,619,918 B1 | 9/2003 | Rebsdorf |
| 6,622,973 B2 | 9/2003 | Al-Garni et al. |
| 6,652,221 B1 | 11/2003 | Praenkel |
| 6,670,721 B2 | 12/2003 | Lof et al. |
| RE38,479 E | 3/2004 | Henkin et al. |
| 6,751,602 B2 | 6/2004 | Kotoulas et al. |
| 6,768,277 B2 | 7/2004 | Ichinose et al. |
| 6,769,873 B2 | 8/2004 | Beauchamp et al. |
| 6,847,128 B2 | 1/2005 | Mikhail et al. |
| 6,853,094 B2 | 2/2005 | Feddersen et al. |
| 6,856,039 B2 | 2/2005 | Mikhail et al. |
| 6,856,040 B2 | 2/2005 | Feddersen et al. |
| 6,856,041 B2 | 2/2005 | Siebenthaler et al. |
| 6,863,239 B2 | 3/2005 | Terpay |
| 6,902,370 B2 | 6/2005 | Dawson et al. |
| 6,911,744 B2 | 6/2005 | Roskey |
| 6,913,228 B2 | 7/2005 | Lee et al. |
| 6,921,045 B2 | 7/2005 | Chang et al. |
| 6,921,985 B2 | 7/2005 | Janssen et al. |
| 6,933,625 B2 | 8/2005 | Feddersen et al. |
| 6,938,854 B2 | 9/2005 | Nelson |
| 6,940,185 B2 | 9/2005 | Andersen et al. |
| 6,949,842 B2 | 9/2005 | Earley |
| 6,966,758 B2 | 11/2005 | Grabau et al. |
| 7,004,724 B2 | 2/2006 | Pierce et al. |
| 7,015,595 B2 | 3/2006 | Feddersen et al. |
| 7,032,860 B1 | 4/2006 | Kirk et al. |
| 7,042,110 B2 | 5/2006 | Mikhail et al. |
| 7,095,129 B2 | 8/2006 | Moroz |
| 7,095,131 B2 | 8/2006 | Mikhail et al. |
| 7,118,336 B2 | 10/2006 | Waddleton |
| 7,118,338 B2 | 10/2006 | Moroz et al. |
| 7,121,795 B2 | 10/2006 | Moroz et al. |
| 7,126,236 B2 | 10/2006 | Harbourt et al. |
| 7,164,368 B1 | 1/2007 | Ireland |
| 7,172,392 B2 | 2/2007 | Wastling et al. |
| 7,199,486 B2 | 4/2007 | Roskey |
| 7,245,037 B2 | 7/2007 | Angquist et al. |
| 7,262,395 B2 | 8/2007 | Bilyk et al. |
| 7,267,300 B2 | 9/2007 | Heath et al. |
| 7,281,891 B2 | 10/2007 | Smith et al. |
| 7,334,755 B2 | 2/2008 | Svoboda, Jr. |
| 7,345,373 B2 | 3/2008 | Delmerico et al. |
| 7,351,033 B2 | 4/2008 | McNerney |
| 7,352,076 B1 | 4/2008 | Gabrys |
| 7,360,996 B2 | 4/2008 | Driver |
| 7,410,123 B2 | 8/2008 | Nunnally |
| 7,416,155 B2 | 8/2008 | Cuccias et al. |
| 7,417,333 B2 | 8/2008 | Miller et al. |
| 7,425,771 B2 | 9/2008 | Rivas et al. |
| 7,445,431 B2 | 11/2008 | Larsen et al. |
| 7,470,086 B2 | 12/2008 | Jennings et al. |
| 7,485,018 B2 | 2/2009 | Wilson et al. |
| 7,525,208 B2 | 4/2009 | Wobben |
| 7,528,496 B2 | 5/2009 | Fortmann |
| 7,569,944 B2 | 8/2009 | Oohara et al. |
| 7,581,926 B1 | 9/2009 | Dehlsen et al. |
| 7,582,977 B1 | 9/2009 | Dehlsen |
| 7,605,488 B2 | 10/2009 | Rebsdorf |
| 7,632,068 B2 | 12/2009 | Bak et al. |
| 7,648,338 B1 | 1/2010 | Welsh |
| 7,658,346 B2 | 2/2010 | Goossen |
| 7,663,262 B2 | 2/2010 | Roskey |
| 7,686,583 B2 | 3/2010 | Siegel |
| 7,692,322 B2 | 4/2010 | Wakasa et al. |
| 7,709,972 B2 | 5/2010 | Arinaga et al. |
| 7,717,673 B2 | 5/2010 | Menke |
| 7,719,128 B2 | 5/2010 | Kammer et al. |
| 7,728,452 B2 | 6/2010 | Arinaga et al. |
| 7,740,448 B2 | 6/2010 | Meyer et al. |
| 7,758,300 B2 | 7/2010 | Friesth |
| 7,761,190 B2 | 7/2010 | Delmerico et al. |
| 7,785,098 B1 | 8/2010 | Appleby et al. |
| 7,789,624 B2 | 9/2010 | Appa et al. |
| 7,802,968 B2 | 9/2010 | Jacobsen |
| 7,819,019 B2 | 10/2010 | Bisgaard |
| 7,834,472 B2 | 11/2010 | Rebsdorf et al. |
| 7,851,934 B2 | 12/2010 | Myborg |
| 7,854,589 B2 | 12/2010 | Nielsen et al. |
| 7,880,321 B2 | 2/2011 | Arinaga et al. |
| 7,884,492 B2 | 2/2011 | Xiong et al. |
| 7,884,562 B2 | 2/2011 | Klatt |
| 7,891,944 B2 | 2/2011 | Jeppesen et al. |
| 7,893,413 B1 | 2/2011 | Appleby et al. |
| 7,896,614 B2 | 3/2011 | Fisher |
| 7,902,487 B2 | 3/2011 | Mistry et al. |
| 7,902,689 B2 | 3/2011 | Kinzie et al. |
| 2002/0105189 A1 | 8/2002 | Mikhail et al. |
| 2003/0230898 A1 | 12/2003 | Jamieson et al. |
| 2004/0094964 A1 | 5/2004 | Mikhail et al. |
| 2004/0207208 A1 | 10/2004 | Mikhail et al. |
| 2005/0062291 A1 | 3/2005 | Earley |
| 2005/0253396 A1 | 11/2005 | Mikhail et al. |
| 2006/0002794 A1 | 1/2006 | Moroz et al. |

(56) References Cited

U.S. PATENT DOCUMENTS

| | | |
|---|---|---|
| 2007/0057517 A1 | 3/2007 | McNerney |
| 2008/0206051 A1 | 8/2008 | Wakasa et al. |
| 2009/0321555 A1 | 12/2009 | Nitzsche et al. |
| 2010/0129215 A1 | 5/2010 | Preus |
| 2010/0143129 A1 | 6/2010 | Fisher |
| 2010/0187820 A1 | 7/2010 | Wakasa et al. |
| 2011/0018280 A1 | 1/2011 | Mahaffy et al. |

FOREIGN PATENT DOCUMENTS

| | | |
|---|---|---|
| JP | 2005061320 | 3/2005 |
| KR | 1020070054331 | 5/2007 |
| WO | 8404362 | 11/1984 |

* cited by examiner

Figure 1

(Prior Art)

Figure 2

(Prior Art)

Figure 3

(Prior Art)

INCREASING WIND / TURBINE SPPED 200

SYSTEM FOR PROVIDING DYNAMIC PITCH CONTROL IN A WIND TURBINE

CLAIM OF PRIORITY

This applicant claims the benefit of priority to U.S. Provisional Patent Application Ser. No. 61/117,059, titled "SYSTEM FOR PROVIDING DYNAMIC PITCH CONTROL IN A WIND TURBINE", filed Nov. 21, 2008; and U.S. Provisional Patent Application Ser. No. 61/117,061, titled "VERTICAL AXIS WIND TURBINE WITH VARIABLE AREA", filed Nov. 21, 2008, each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to wind turbines and other mechanical turbines and motors, and is particularly related to a system for providing dynamic pitch control in a wind turbine.

BACKGROUND

Wind power is the conversion of wind energy into a useful form of energy, such as electricity, using a wind turbine. Large wind turbines, and groups of turbines referred to as wind farms, can be connected to the electrical grid, and their power output used to power whole communities. Smaller, individual wind turbines can be used to provide power to isolated locations, such as single household or farm. Wind energy is a plentiful, renewable, and clean energy source, and is an important step in eliminating dependence on fossil fuels, reducing greenhouse gas emissions, and providing an alternative and environmentally friendly energy source. Technologies that allow wind turbines to make more optimal use of available winds are of great interest in promoting the advance of wind power. This is the general area that embodiments of the invention are intended to address.

SUMMARY

Described herein is a system for providing dynamic pitch control in a wind turbine. In accordance with an embodiment, the dynamic pitch control uses a starting spring to pitch the blades of the wind turbine into a starting position that is suited for very low wind speeds. The pitch control then automatically pitches the blades into a run position as the wind speed increases, using a combination of a rotational mass and a restraining spring. This allows the turbine to be started, and to generate power, at a much lower starting wind speed than the turbine's operating wind speed, yet still operate at optimal speeds in its typical running range. In accordance with an embodiment, as the wind speed further increases beyond an overspeed limit, the rotational mass overcomes its restraining spring, and automatically pitches the blades back toward and beyond their start position, thereby limiting rotation speed and power reducing the likelihood of damage to the turbine caused by high speeds.

DETAILED DESCRIPTION

Described herein is a system for providing dynamic pitch control in a wind turbine. As described above, wind energy is a plentiful, renewable, and clean energy source, and is an important step in eliminating dependence on fossil fuels, reducing greenhouse gas emissions, and providing an alternative and environmentally friendly energy source. Wind turbines are generally designed to produce electrical energy efficiently, which usually requires the turbines to operate in the most typical and commonly experienced conditions. However, available wind speed is itself a variable quantity, and even for a particular location can vary substantially from day-to-day, and even at different times of the day. Wind turbines are generally designed so that they yield maximum power output at average wind speeds, for example 30 knots. It rarely pays to design the turbine to increase output at stronger winds, since stronger winds are comparatively rarer than weak winds. Even if the power output could be increased, the mechanical forces on the turbine at high rotation can make it unstable and prone to damage if it does not limit power and rotation speed in very high wind speeds. For this reason, many wind turbines include some form of power control that controls or governs the maximum rotation of the turbine blades at high wind speeds, and correspondingly governs the maximum power output of the turbine.

Two of the more common ways to govern a wind turbine are pitch control and stall control. Both of these techniques can be designed to be passive, in which case the operation of the wind against the turbine itself initiates the control; or active, in which case a computer or other controller monitors wind or turbine speed and initiates the control. Stall-controlled wind turbines are not described in detail herein. In an active pitch controlled wind turbine, the turbine's controller monitors the maximum rotation of the blades, or the power output of the turbine. When the speed or power output becomes too high, it adjusts the blade pitch mechanism, which immediately pitches (turns) the rotor blades slightly out of the wind, and causes the turbine rotation speed to be reduced. The blades can then be turned back into the wind whenever the wind drops again, which causes the turbine rotation speed to be increased. To pitch, each rotor blade has to be able to turn around their longitudinal axis. In a passive pitch control system, the control is performed by the forces generated by the moving turbine itself, rather than an externally-triggered force. When the blades rotate increasingly faster at higher wind speeds, the pitch mechanism generates a correspondingly higher centripetal force. This centripetal force can be used to mechanically pitch the blades, and to control or govern the turbine's speed.

As described above, one of the advantages of passive pitch control is that it can be used to slow the blade rotation, and reduce the likelihood of damage to the turbine at high speeds. However, the commonly available forms of pitch control have no effect whatsoever at low rotation speeds. Furthermore, as described above, most wind turbines are generally designed so that they yield maximum power output at average wind speeds. This generally requires that the starting pitch of the turbine blades are usually in the optimal run position. A problem with this approach is that each wind turbine differs in their starting wind speed versus their running speed range. While a wind turbine may be designed to run in a range of 5-30 knots, it may take an initial wind speed of 10 knots to start rotating that same turbine. If a working turbine drops below its operating speed (in this example, say below 5 knots), then it must wait idle for a higher wind speed (in this example, 10 knots), before it can be started again.

In accordance with an embodiment, a system for providing dynamic pitch control in a wind turbine is provided. In a traditional wind turbine, the starting pitch of the turbine blades are usually presented in their optimal run position, so that, once the wind turbine has been started, the wind turbine yields good power output at typical wind speeds. However, the starting wind speed that is needed to start the wind turbine is often higher than the lower limit of the turbine's operating wind speed. This represents a wind obstacle that must be overcome before any power is produced, and hinders overall turbine performance.

In accordance with an embodiment, a dynamic pitch control uses a starting spring to pitch the blades of the wind turbine into a starting position that is suited for very low wind speeds. The pitch control then automatically pitches the blades into a run position as the wind speed increases, using a combination of a rotational mass and a restraining spring. This allows the turbine to be started, and to generate power, at a much lower starting wind speed than the turbine's operating wind speed, yet still operate at optimal speeds in its typical running range. In accordance with an embodiment, as the wind speed further increases beyond an overspeed limit, the rotational mass overcomes its restraining spring, and automatically pitches the blades back toward and beyond their start position, reducing the likelihood of damage to the turbine caused by high speeds.

Figure 1:
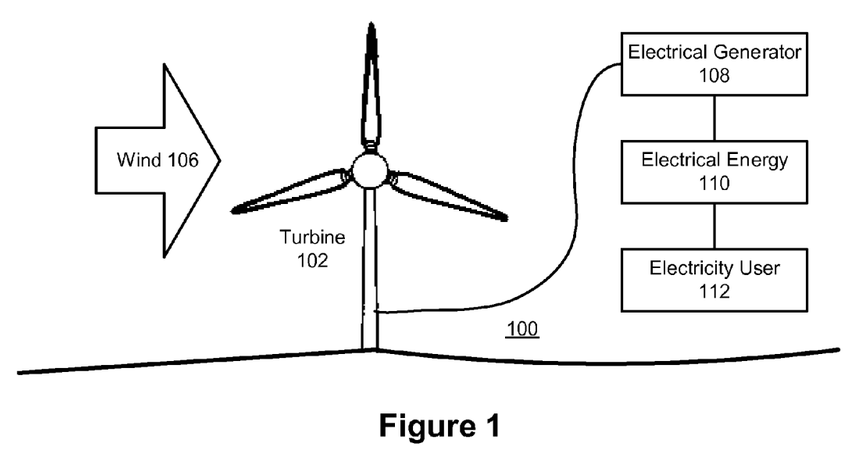
FIG. 1 is an illustration of a system that uses a wind turbine for generation of power, in accordance with an embodiment.

FIG. 1 is an illustration of a system 100 that uses a wind turbine for generation of power, in accordance with an embodiment. As shown in FIG. 1, in a typical wind power system, a turbine 102 is used to harness the power of the wind 106. Examples of wind turbines include horizontal-axis wind turbines (HAWT), which have the main rotor shaft and electrical generator at the top of a tower, and must be pointed into the wind; and vertical-axis wind turbines (VAWT), which have the main rotor shaft arranged vertically. Most turbines have a gearbox, which turns the generally slower rotation of the blades into a quicker rotation that is more suitable to drive an electrical generator 108. The electricity produced 110 can be stored, fed into an electrical grid, or otherwise provided to an electricity user 112.

Figure 2:
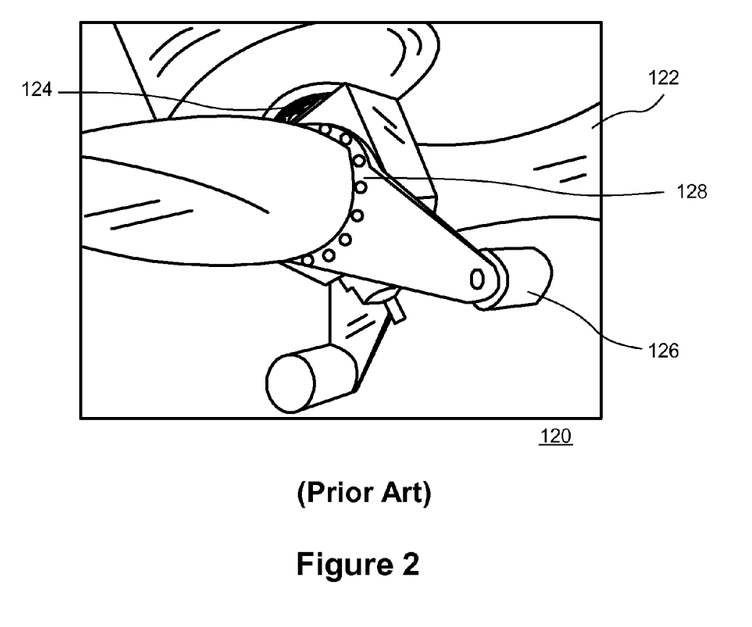
FIG. 2 is an illustration of a system for providing pitch control in a wind turbine in accordance with the prior art.

FIG. 2 is an illustration of a system 120 for providing pitch control in a wind turbine in accordance with the prior art. As described above, in a traditional wind turbine, the starting pitch of the turbine blades are usually presented in their optimal run position, so that, once the wind turbine has been started, the wind turbine yields good power output at typical wind speeds. In a pitch controlled wind turbine, the turbine monitors the maximum rotation of the blades, and when the speed becomes too high, it adjusts the blade pitch mechanism, which immediately pitches the rotor blades slightly out of the wind, and causes the turbine rotation speed to be reduced. As shown in FIG. 2, in many systems that use a pair of blades the blades 122 are coupled to and rotate about a shaft 124, but are able to turn either independently or as a set around their longitudinal axis. In the system shown in FIG. 2, while the blades rotate, a number of masses 126 coupled 128 to each blade's longitudinal axis rotate with the spinning turbine. When the oncoming wind increases, and the speed of rotation of the turbine blades similarly quickens, the centripetal forces exerted outward by each mass increases correspondingly, which causes rotation of each blade about its longitudinal axis. This pitches the blades away from the oncoming wind, and depowers the turbine. When the wind speed lessens, the blades return to their non-pitched or normal operating position.

Figure 3:
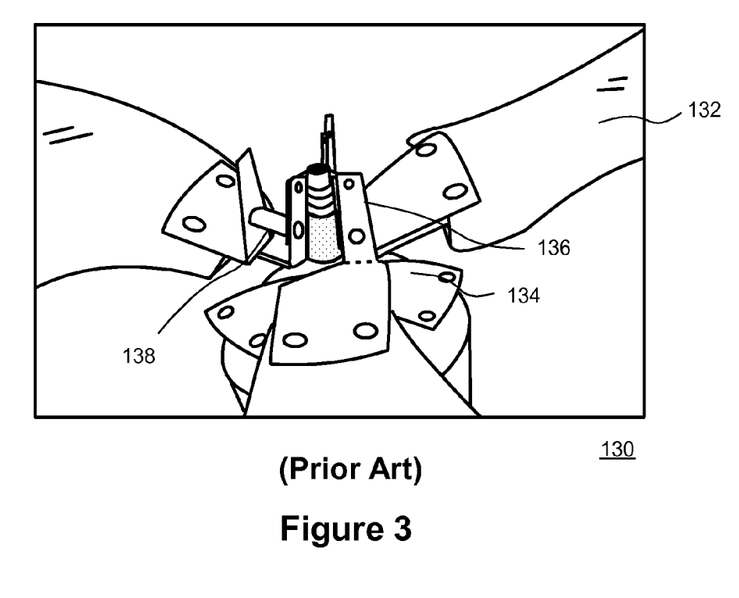
FIG. 3 is another illustration of a system for providing pitch control in a wind turbine in accordance with the prior art.

FIG. 3 is another illustration of a system 130 for providing pitch control in a wind turbine in accordance with the prior art. As shown in FIG. 3, the blades 132 are similarly coupled to and rotate about a shaft 134 via a central coupling 136, and independent blade cylinders 138, but are otherwise able to turn either independently or as a set around their longitudinal axis. In the system shown in FIG. 3, when the oncoming wind increases, and the speed of rotation of the turbine blades similarly quickens, the moment of force exerted by the mass of each blade's cylinder increases correspondingly, which causes rotation of each blade about its longitudinal axis, and pitches the blade away from the oncoming wind. This again depowers the turbine, until the wind speed lessens, at which point the blades return to their non-pitched or normal operating position.

Figure 4:
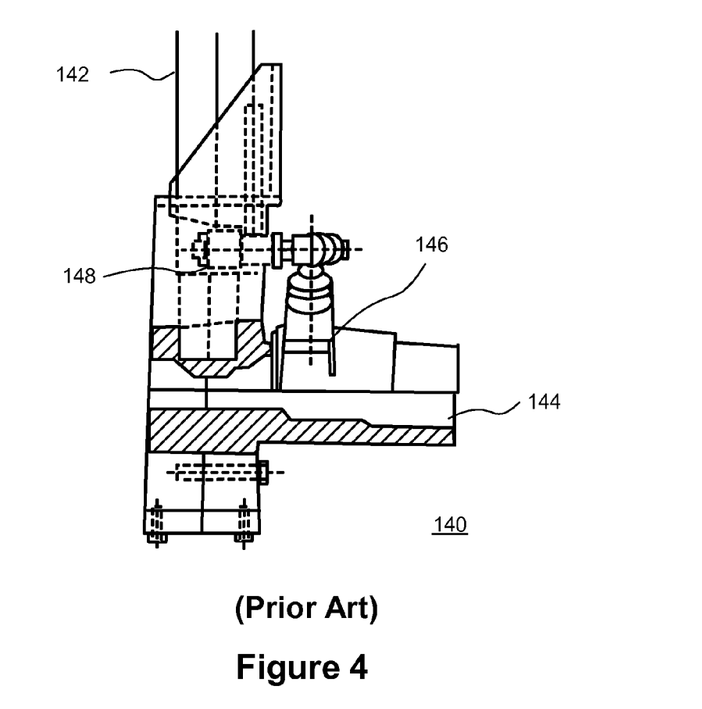
FIG. 4 is another illustration of a system for providing pitch control in a wind turbine in accordance with the prior art.

FIG. 4 is another illustration of a system 140 for providing pitch control in a wind turbine in accordance with the prior art. As shown in FIG. 4, the blades 142 are similarly coupled to and rotate about a shaft 144 via a central coupling referred to as a spider 146, and knuckle-type couplings 148 to each blade. The use of a spider allows the pitch of all of the blades to be controlled simultaneously by movement of the spider. The blade pitch is controlled initially by a fixed tension spring. In the system shown in FIG. 4, when the oncoming wind increases, and the speed of rotation of the turbine blades similarly quickens, the centripetal force exerted by each blade overcomes the spring tension, and the blades are at the same time forced out along their shaft. The knuckle-type couplings that are attached between the spider and the blades pitch the blades into the oncoming wind, and depowers the turbine. Again, when the wind speed lessens, the blades return to their non-pitched or normal operating position.

As described above, one of the advantages of pitch control is that it can be used to slow the blade rotation, and reduce the likelihood of damage to the turbine at high speeds. However, the forms of pitch control described above have no effect whatsoever at low rotation speeds. Furthermore, as described above, most wind turbines are generally designed so that they yield maximum power output at average wind speeds. This generally requires that the starting pitch of the turbine blades are usually in the optimal run position, or as described above, that the pitch control mechanism pitches the blades to stall or feather at overspeed, and then back to their optimal run position.

Figure 5:
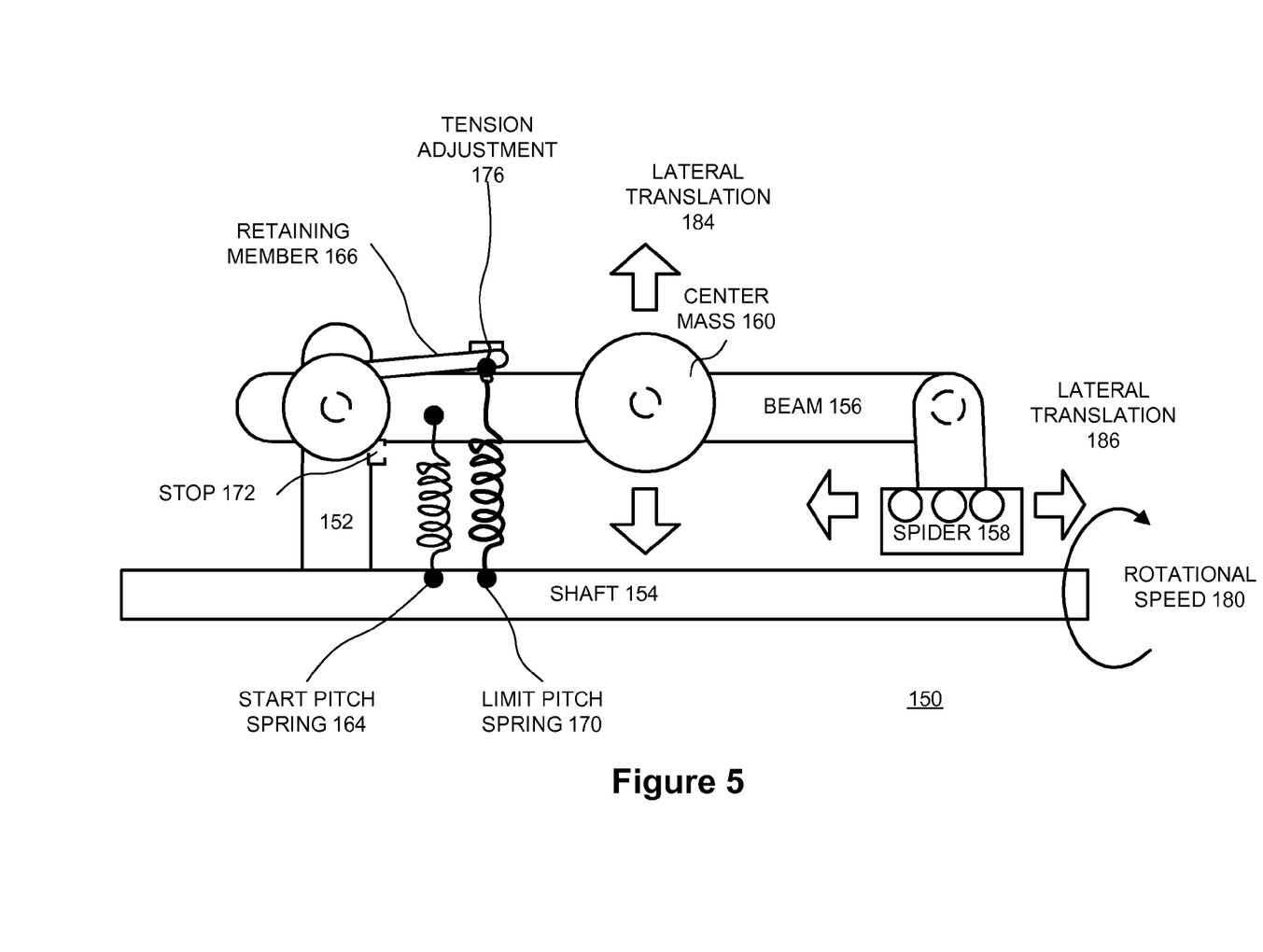
FIG. 5 is an illustration of a system for providing dynamic pitch control in a wind turbine, in accordance with an embodiment.

FIG. 5 is an illustration of a system for providing dynamic pitch control in a wind turbine, in accordance with an embodiment. As shown in FIG. 5, in accordance with an embodiment, the pitch control comprises a combination spring and mass mechanism 150 coupled to the turbine drive shaft 154 via a support 152. The pitch control further comprises a beam 156 that is generally linear, but that includes one or more couplings so that the beam has a first portion and a second portion, and so that the beam can be deformed in a direction transverse to its length. The beam is connected to a spider 158, that in turn can be used to control the pitch of the turbine's blades. In accordance with an embodiment, the first portion of the beam is held close to the shaft using a start pitch spring 164, and a limit pitch spring 170. The beam further includes a coupling approximately central to the beam that includes a center mass 160. The second portion of the beam is connected to the spider.

A retaining member 166 together with a stop 172 ensures that in a first position of the beam, only the start pitch spring has operable tension on the beam, with the stop preventing the retaining member and its limit pitch spring from having any considerable tension on the beam. The limit pitch spring is connected to the retaining member using a tension adjustment means 176, such as a threaded nut or bolt.

In usage, when the rotational speed 180 of the turbine is zero, or very low, the start pitch spring deforms the beam, pulling it closer to the shaft. This shortens the effective length of the beam and pulls the spider closer toward the support (i.e. away from the blades). Since the spider is coupled to the turbine blades, this movement can be used to control the pitch of the blades, and in particular to pitch the blades in the optimal position for a low wind speed start. When the rotational speed of the turbine increases, the center mass exerts a centripetal force on the beam, and the lateral or outward translation 184 of the mass negates the deformation on the beam. This lengthens the effective length of the beam, and causes a corresponding lateral translation 186 of the spider away from the support (i.e. toward the blades). Again, since the spider is coupled to the turbine blades, this can be used to control the pitch of the blades, and in particular to pitch the blades in this instance to the optimal position for normal running speed. The limit pitch spring and its tension adjustment can be adjusted to control the tension and to tune the degree to which the center mass has such an effect the blades. When the rotational speed of the turbine increases further to its maximum operating range, the center mass exerts a centripetal force on the beam that exceeds the pre-set tension of the limit pitch spring. Once again, this shortens the effective length of the beam and pulls the spider closer toward the support (i.e. away from the blades), which pitches the blades back to either their start position, or another stalled or feathered position, depowering the turbine. The process repeats with changes in wind condition, and corresponding changes in blade pitch to compensate.

Figure 6A:
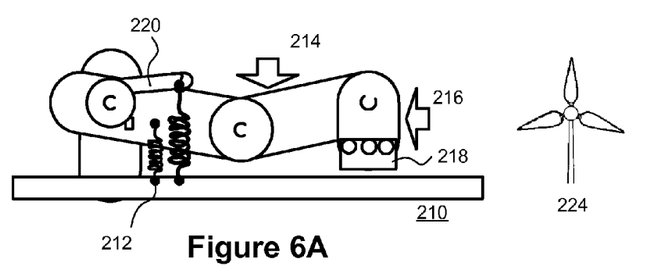
FIGS. 6A-6C are another illustration of a system for providing dynamic pitch control in a wind turbine, in accordance with an embodiment.
Figure 6B:
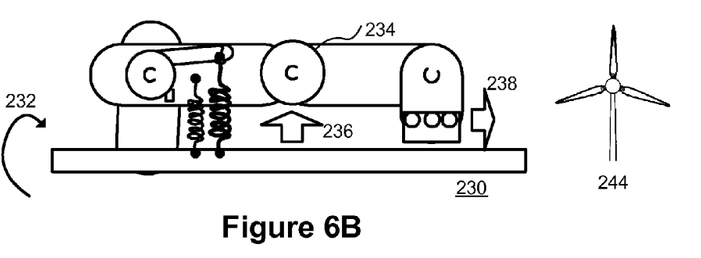
Figure 6C:
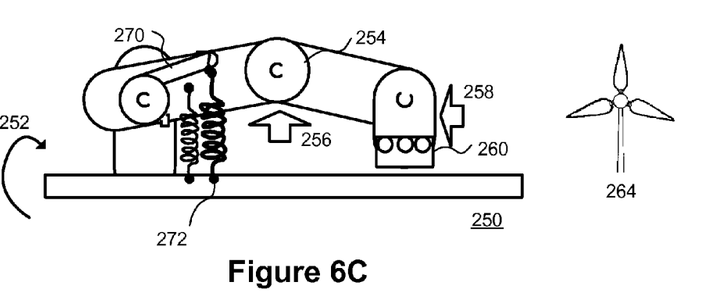

FIG. 6 is another illustration of a system for providing dynamic pitch control in a wind turbine, in accordance with an embodiment. In particular, FIGS. 6A through 6C illustrate the operation of the pitch control with varying wind speed 200.

As shown in FIG. 6A, in zero or very low wind speeds 210, when the rotational speed of the turbine is similarly zero, or very low, the start pitch spring 212 deforms the beam 214, pulling it closer to the shaft, which simultaneously shortens the effective length of the beam, pulls 216 the spider 218 closer toward the support, and pitches the blades in an optimal position 224 for a low wind speed start. At zero or low rotation speeds, the stop of the retaining member prevents the limit pitch spring from having any effect on the beam or pitch.

As shown in FIG. 6B, in moderate wind speeds 230, when the rotational speed 232 of the turbine increases, the center mass 234 exerts a centripetal force 236 on the beam, pushing it away from the shaft, which simultaneously lengthens or straightens the effective length of the beam, pushes 238 the spider further from the support, and pitches the blades in their optimal run position 244. At moderate wind and rotational speeds, the limit pitch spring constricts the center mass from moving too far outward, and keeps the turbine blades at an optimal pitch.

As shown in FIG. 6C, in high wind speeds 250, when the rotational speed 252 of the turbine further increases to the operating limits of the turbine, the center mass 254 continues to exert a centripetal force 256 on the beam, pushing it even further away from the shaft, which simultaneously shortens the effective length of the beam, pulls 258 the spider 260 back again closer toward the support, and pitches the blades to either their start position, or another stalled or feathered position, depowering the turbine. At high wind speeds as the rotational speed increases, the limit pitch spring is tensioned to allow the center mass to move further outward, and to reduce the power output of the turbine, which reduces the likelihood of damage.

In the description of the above embodiment, the dynamic pitch control is shown as being positioned generally downwind from the turbine blades, and having tension springs on one side of the beam. It will be evident that in accordance with other embodiments the dynamic pitch control can alternatively be positioned upwind from the turbine blades, i.e. in front of the blades. Similarly, it will be evident that in accordance with other embodiments, compression springs can be used on one or more sides of the beam, or a combination of tension springs and compression springs can be used. In accordance with other embodiments, the dynamic pitch control can also be duplicated within a single control mechanism, for example to provide greater control, and redundancy in case of failure.

Figure 7:
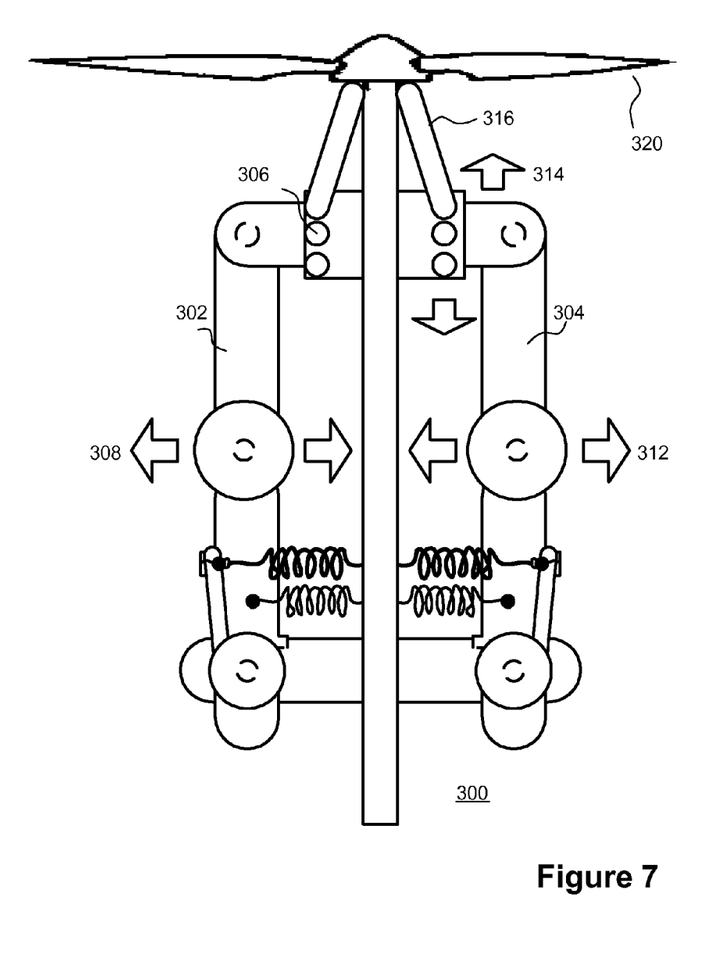
FIG. 7 is another illustration of a system for providing dynamic pitch control in a wind turbine, in accordance with an embodiment.

FIG. 7 is another illustration of a system for providing dynamic pitch control in a wind turbine, in accordance with an embodiment. As shown in FIG. 7, in accordance with an embodiment, and by way of example, a dynamic pitch control mechanism 300 can be provided in which a plurality of individual pitch controllers 302, 304 can be combined to control the movement of, in this instance, a single spider 306. As the turbine rotates, the centripetal forces 308, 312 exerted by each of the masses contribute to the movement 314 of the spider. The spider can in turn be coupled using independent knuckle-type couplings 316 to the turbine blades, and can be used to control the pitch of the blades 320 as described above.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that different means of implementing or connecting and using the dynamic pitch control mechanism with the blades can be used. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing pitch control in a wind turbine, comprising:
   a turbine shaft that is adapted to rotate about its longitudinal axis to generate electrical power;
   a plurality of blades coupled to the shaft, and oriented to receive wind power and cause rotation in the turbine shaft, wherein each of the plurality of blades can be pitched about its longitudinal axis to expose more or less of the blade to the wind power;
   a pitch control mechanism including a combination of springs and mass, which pitches the blades at a lower starting wind speed into the wind to start the turbine, and then as the wind speed increases to a running wind speed uses the centripetal force of the mass, counterbalanced by a limit spring, to pitch the blades to the run position and increase the power output of the wind turbine;
   wherein the pitch control further comprises a beam that is generally linear, and that includes one or more couplings so that the beam has a first portion and a second portion, and so that the beam can be deformed in a direction transverse to its length, and wherein the beam is connected to a spider that in turn can be used to control the pitch of the turbine's blades;
   wherein the first portion of the beam is held close to the shaft using a start pitch spring, and a limit pitch spring, and wherein the beam further includes a coupling approximately central to the beam that includes a center mass, and wherein the second portion of the beam is connected to the spider; and
   wherein the pitch control further comprises a retaining member together with a stop that ensures that in a first position of the beam, only the start pitch spring has operable tension on the beam, with the stop preventing the retaining member and its limit pitch spring from having any considerable tension on the beam.

2. The system of claim 1, wherein the pitch control mechanism, as the wind speed further increases to an overspeed wind speed, uses the centripetal force to overcome the limit spring, and pitch the blades away from the wind to govern the power output of the wind turbine.

3. The system of claim 1, wherein the limit pitch spring is connected to the retaining member using a tension adjustment means, such as a threaded nut or bolt.

4. The system of claim 1, wherein the pitch control operates so that
   when the rotational speed of the turbine is zero, or very low, the start pitch spring deforms the beam, pulling it closer to the shaft, which shortens the effective length of the beam and pulls the spider away from the blades,
   when the rotational speed of the turbine increases, the center mass exerts a centripetal force on the beam, and the lateral or outward translation of the mass negates the deformation on the beam, which lengthens the effective length of the beam, and causes a corresponding lateral translation of the spider towards the blades, and
   when the rotational speed of the turbine increases further to its maximum operating range, the center mass exerts a centripetal force on the beam that exceeds the pre-set tension of the limit pitch spring, which shortens the effective length of the beam and pulls the spider away from the blades.

5. A system for providing pitch control in a wind turbine, comprising:
   a turbine shaft that is adapted to rotate about its longitudinal axis to generate electrical power;
   a plurality of blades coupled to the shaft at one end, and oriented to receive wind power and cause rotation in the turbine shaft, wherein each of the plurality of blades can be pitched about its longitudinal axis to expose more or less of the blade to the wind power;
   a pitch control mechanism including a combination of springs and mass, which pitches the blades at a lower starting wind speed into the wind to start the turbine, and then as the wind speed increases to a running wind speed uses the centripetal force of the mass, counterbalanced by a limit spring, to pitch the blades into the run position and increase the power output of the wind turbine, wherein the pitch control mechanism, as the wind speed further increases to an overspeed wind speed, uses the centripetal force to overcome the limit spring, and pitch the blades into the wind to govern the power output of the wind turbine;
   a beam that is generally linear, and that includes one or more couplings so that the beam has a first portion and a second portion, and so that the beam can be deformed in a direction transverse to its length, and wherein the beam is connected to a spider that can be used to control the pitch of the turbine's blades, wherein the first portion of the beam is held close to the shaft using a start pitch spring, and a limit pitch spring, and wherein the beam further includes a coupling approximately central to the beam that includes a center mass, and wherein the second portion of the beam is connected to the spider; and
   wherein the pitch control operates so that
      when the rotational speed of the turbine is zero, or very low, the start pitch spring deforms the beam, pulling it closer to the shaft, which shortens the effective length of the beam and pulls the spider away from the blades,
      when the rotational speed of the turbine increases, the center mass exerts a centripetal force on the beam, and the lateral or outward translation of the mass negates the deformation on the beam, which lengthens the effective length of the beam, and causes a corresponding lateral translation of the spider towards the blades.

6. A system for governing power in a motor, comprising:
   a motor shaft that is adapted to rotate about its longitudinal axis;
   a speed control mechanism including a combination of springs and mass, which uses the centripetal force of the mass, counterbalanced by a limit spring, to govern the power output of the motor;
   a beam that is generally linear, but that includes one or more couplings so that the beam has a first portion and a second portion, and so that the beam can be deformed in a direction transverse to its length, and wherein the beam is connected to a spider that in turn can be used to control the rotational speed of the shaft;
   wherein the speed control mechanism, as rotational speed of the shaft increases to a limit, uses the centripetal force to overcome the limit spring, deform the beam, and move the spider to govern the power output of the motor;
   wherein the first portion of the beam is held close to the shaft using a start pitch spring, and a limit pitch spring, and wherein the beam further includes a coupling approximately central to the beam that includes a center mass, and wherein the second portion of the beam is connected to the spider; and
   wherein the speed control further comprises a retaining member together with a stop that ensures that in a first position of the beam, only the start pitch spring has operable tension on the beam, with the stop preventing the retaining member and its limit pitch spring from having any considerable tension on the beam.

* * * * *